United States Patent
Di Pietro et al.

(10) Patent No.: US 9,674,207 B2
(45) Date of Patent: Jun. 6, 2017

(54) HIERARCHICAL ATTACK DETECTION IN A NETWORK

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/338,794

(22) Filed: Jul. 23, 2014

(65) Prior Publication Data

US 2016/0028752 A1 Jan. 28, 2016

(51) Int. Cl.
*H04L 29/06* (2006.01)

(52) U.S. Cl.
CPC ...... *H04L 63/1416* (2013.01); *H04L 63/1458* (2013.01); *H04L 63/1408* (2013.01); *H04L 63/1441* (2013.01)

(58) Field of Classification Search
CPC ............. H04L 63/1416; H04L 63/1441; H04L 63/1408; H04L 63/1458
USPC .......................................................... 726/23
See application file for complete search history.

(56) References Cited

U.S. PATENT DOCUMENTS

| | | | |
|---|---|---|---|
| 7,054,930 B1 * | 5/2006 | Cheriton | H04L 63/0263 370/390 |
| 7,281,085 B1 * | 10/2007 | Garg | G11C 15/00 370/235 |
| 7,299,277 B1 * | 11/2007 | Moran | H04L 41/5022 370/230 |
| 7,530,105 B2 | 5/2009 | Gilbert et al. | |
| 7,545,748 B1 * | 6/2009 | Riddle | H04L 43/08 370/230 |
| 7,554,983 B1 * | 6/2009 | Muppala | H04L 12/2697 370/392 |
| 7,668,843 B2 | 2/2010 | Ertoz et al. | |
| 7,707,305 B2 * | 4/2010 | Afek | H04L 63/1458 709/235 |

(Continued)

OTHER PUBLICATIONS

Patcha, A., et al, Detecting Denial-of-Service Attacks with Incomplete Audit Data, 2005, Bradley Dept. of Electrical and Computer Engineering, Virginia Polytechnic Institute and State University, entire document, http://www.arias.ece.vt.edu/pdfs/patcha-2005-1.pdf.*

(Continued)

*Primary Examiner* — Kari Schmidt
*Assistant Examiner* — Ronald Baum
(74) *Attorney, Agent, or Firm* — Parker Ibrahim & Berg LLC; James M. Behmke; Kenneth J. Heywood

(57) ABSTRACT

In one embodiment, a device in a network identifies a set of traffic flow records that triggered an attack detector. The device selects a subset of the traffic flow records and calculates aggregated metrics for the subset. The device provides the aggregated metrics for the subset to the attack detector to generate an attack detection determination for the subset of traffic flow records. The device identifies one or more attack traffic flows from the set of traffic flow records based on the attack detection determination for the subset of traffic flow records.

13 Claims, 9 Drawing Sheets

(56) References Cited

U.S. PATENT DOCUMENTS

| | | | |
|---|---|---|---|
| 7,760,653 B2* | 7/2010 | Poletto | H04L 41/0631 |
| | | | 370/242 |
| 8,402,540 B2* | 3/2013 | Kapoor | G06F 9/505 |
| | | | 709/224 |
| 8,418,249 B1* | 4/2013 | Nucci | G06F 21/552 |
| | | | 706/20 |
| 8,544,087 B1 | 9/2013 | Eskin et al. | |
| 9,094,288 B1* | 7/2015 | Nucci | H04L 43/026 |
| 2002/0032717 A1* | 3/2002 | Malan | H04L 12/2602 |
| | | | 718/105 |
| 2002/0035698 A1* | 3/2002 | Malan | H04L 12/2602 |
| | | | 726/23 |
| 2004/0233846 A1 | 11/2004 | Khandani et al. | |
| 2005/0210533 A1* | 9/2005 | Copeland | H04L 63/1416 |
| | | | 726/23 |
| 2005/0286423 A1* | 12/2005 | Poletto | H04L 63/1425 |
| | | | 370/235 |
| 2006/0242694 A1* | 10/2006 | Gold | H04L 63/1441 |
| | | | 726/13 |
| 2007/0064610 A1 | 3/2007 | Khandani et al. | |
| 2007/0226239 A1* | 9/2007 | Johnson | H04L 43/022 |
| 2007/0289013 A1 | 12/2007 | Lim | |
| 2008/0263661 A1* | 10/2008 | Bouzida | H04L 63/1416 |
| | | | 726/22 |
| 2009/0055529 A1* | 2/2009 | Truong | H04L 12/2602 |
| | | | 709/224 |
| 2010/0070647 A1* | 3/2010 | Irino | H04L 47/10 |
| | | | 709/234 |
| 2010/0071024 A1* | 3/2010 | Eyada | H04L 63/0263 |
| | | | 726/1 |
| 2010/0284282 A1* | 11/2010 | Golic | H04L 43/022 |
| | | | 370/242 |
| 2011/0138463 A1 | 6/2011 | Kim et al. | |
| 2012/0284793 A1 | 11/2012 | Steinbrecher et al. | |
| 2015/0293846 A1* | 10/2015 | Goyal | H04L 63/0227 |
| | | | 711/122 |

OTHER PUBLICATIONS

Callegari, C., 'Statistical Approaches for Network Anomaly Detection', Dept. of Information Engineering University of Pisa, ICIMP Conference, May 9, 2009, entire document, https://www.iaria.org/conferences2010/filesICIMP10/ICIMP_Tutorial_Christian_Callegari.pdf.*

Udhayan et al., "Statistical Segregation Method to Minimize the False Detections During DDoS Attacks", International Journal of Network Security, Nov. 2011, pp. 152-160, vol. 13, No. 3.

International Search Report dated Oct. 28, 2015 in connection with PCT/US2015/041238.

* cited by examiner

HIERARCHICAL ATTACK DETECTION IN A NETWORK

TECHNICAL FIELD

The present disclosure relates generally to computer networks, and, more particularly, to using hierarchical attack detection in a network.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network identifies a set of traffic flow records that triggered an attack detector. The device selects a subset of the traffic flow records and calculates aggregated metrics for the subset. The device provides the aggregated metrics for the subset to the attack detector to generate an attack detection determination for the subset of traffic flow records. The device identifies one or more attack traffic flows from the set of traffic flow records based on the attack detection determination for the subset of traffic flow records.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
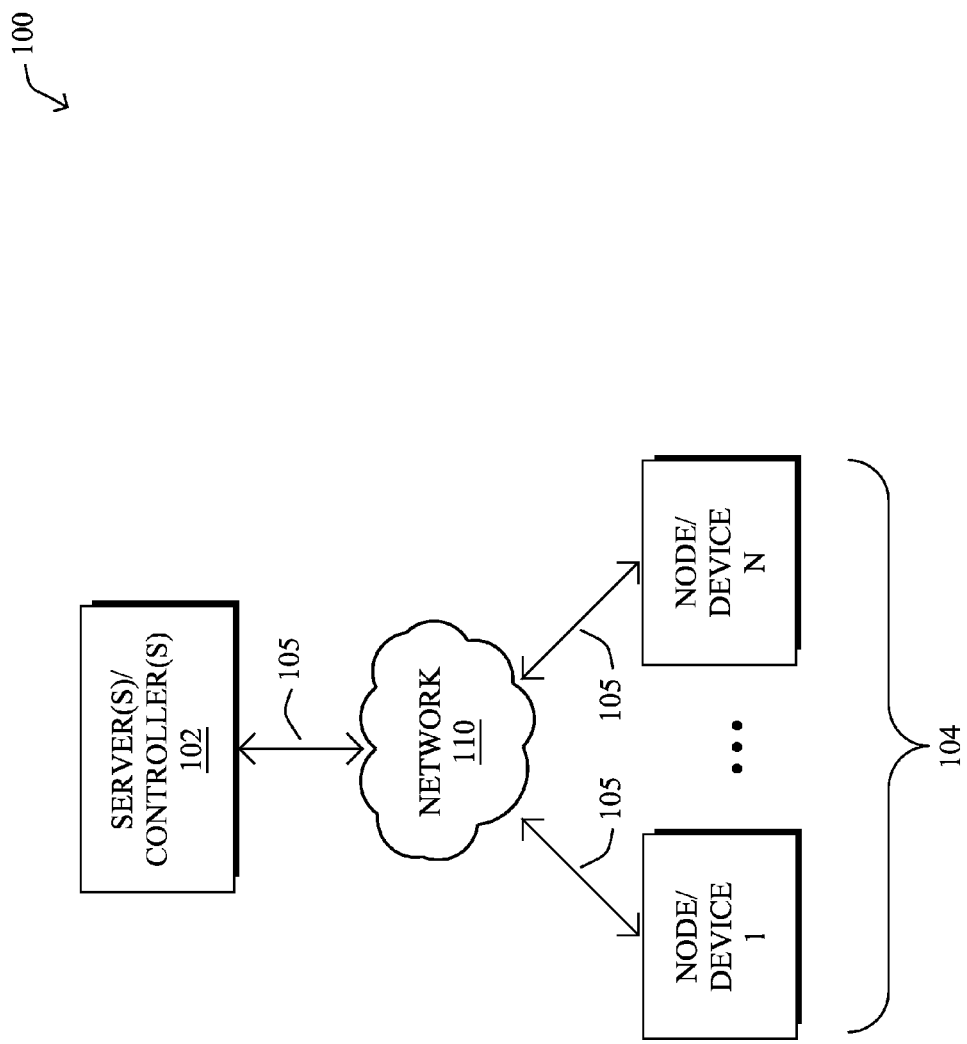
FIG. 1 illustrates an example communication network.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in network 110.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
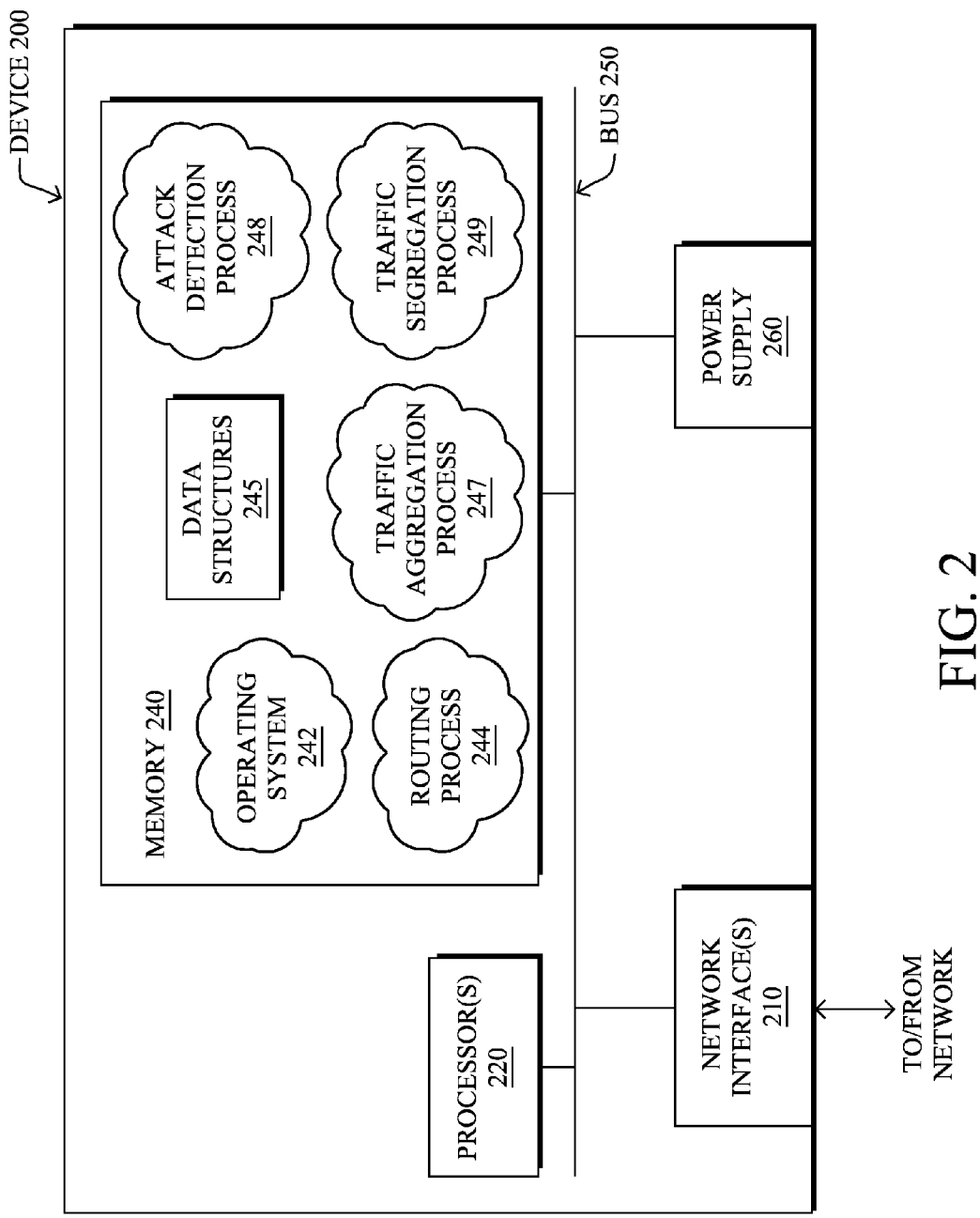
FIG. 2 illustrates an example network device/node.

FIG. 2 is a schematic block diagram of an example node/device 200 that may be used with one or more embodiments described herein, e.g., as any of the devices shown in FIG. 1 (e.g., a server/controller 102, a node/device 104, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a traffic aggregation process 247, an attack detection process 248, and/or a traffic segregation process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments attack detection process 248 may use machine learning to detect an attack. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. Further categories that represent specific types of attacks may also be used (e.g., a "UDP flooding attack" label, etc.). Said differently, attack detection process 248 may be configured to assign one of a set of output labels (e.g., "normal," "attack," etc.) to an input set of network observations or metrics. In various cases, an applied label may also have an associated probability determined by the learning machine (e.g., a confidence score associated with an applied label, etc.).

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, density-based special clustering of applications with noise (DBSCAN), or Mean-Shift, among others.

Traffic aggregation process 247, as described in greater detail below, includes computer executable instructions executed by the processor 220 to perform functions regarding the aggregation of traffic data into inputs for attack detection process 248. For example, traffic aggregation process 247 may determine an average flow duration, average number of bytes of a flow, an average number of packets, a proportion of traffic attributable to a particular application, or other such aggregated traffic metrics for analysis by attack detection process 248.

Traffic segregation process 249, as detailed below, includes computer executable instructions executed by the processor 220 to perform functions regarding the segregation of traffic flows into attack-related and "normal" traffic flows. In particular, if attack detection process 248 detects an attack using aggregated traffic data from traffic aggregation process 247, traffic segregation process 249 may operate in conjunction with attack detection process 248 to identify which flows are actually attack-related.

Figure 3A:
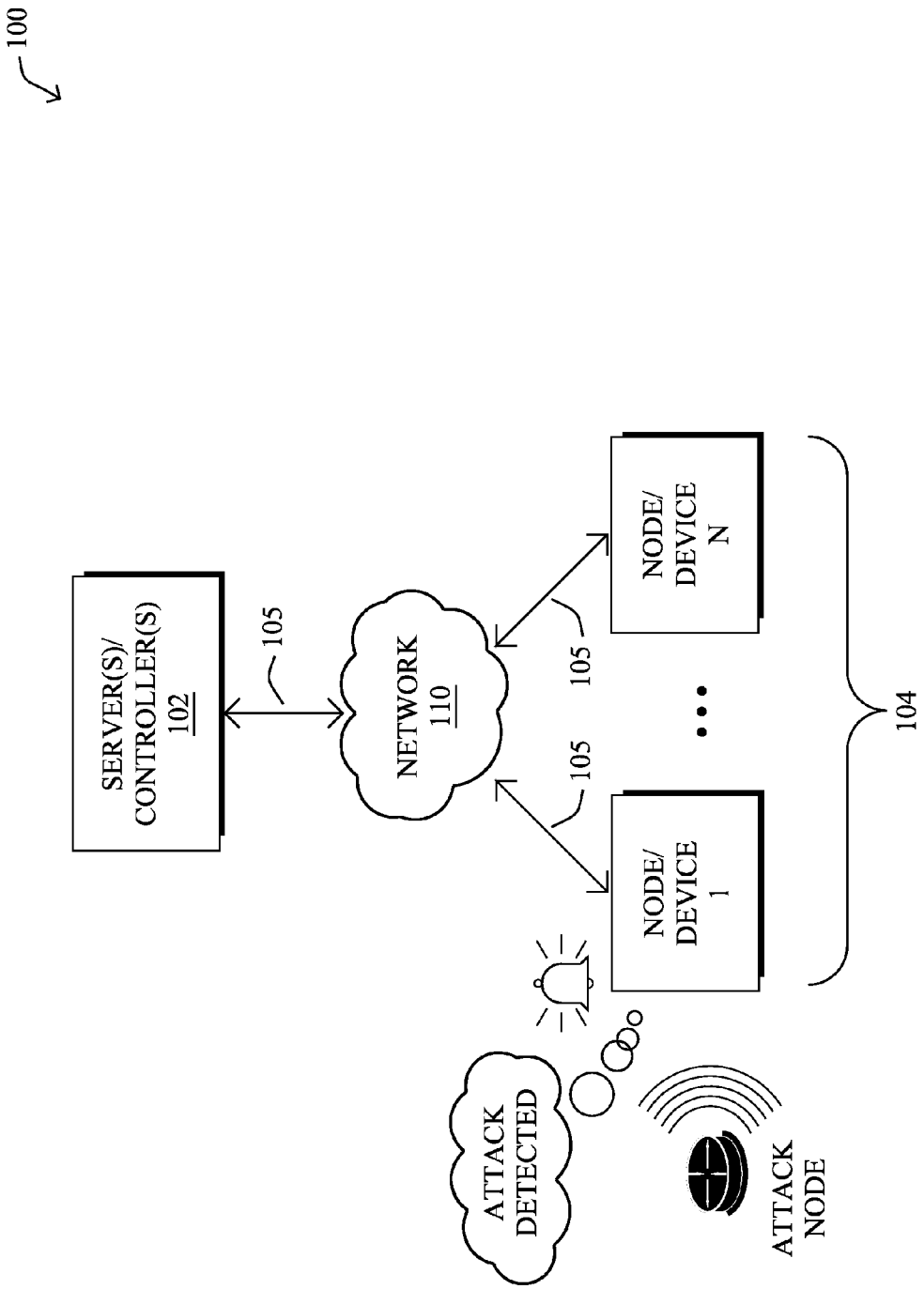
FIGS. 3A-3B illustrate an example of a network attack being detected.
Figure 3B:
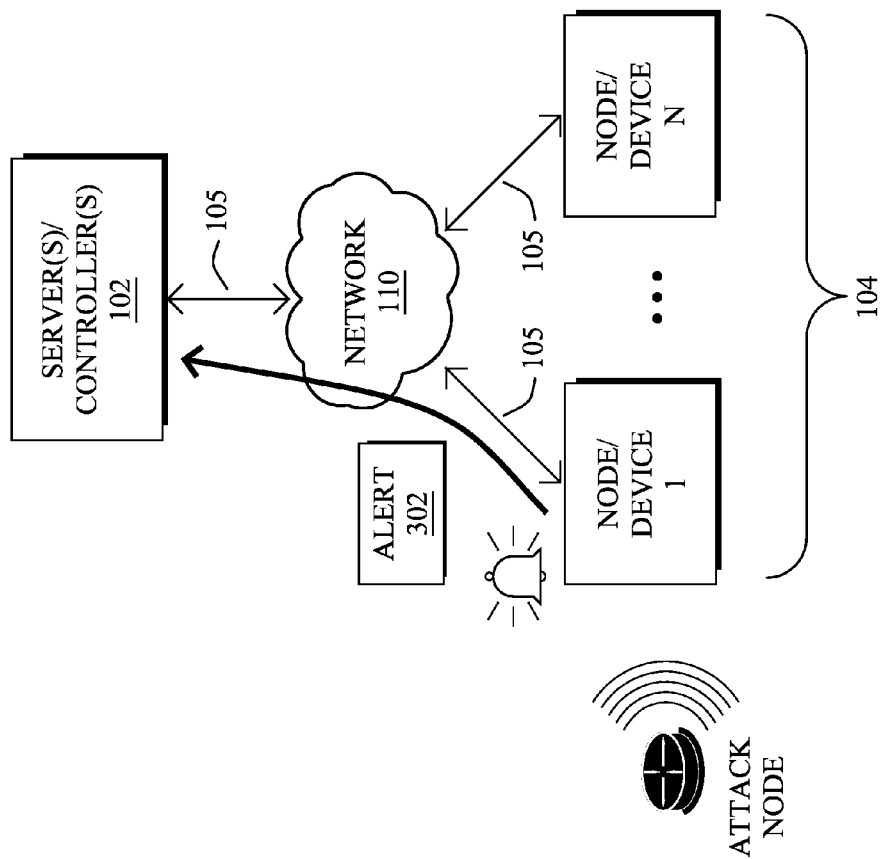

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As noted above, a machine learning process may be trained to detect a network attack by analyzing traffic data regarding the network. However, once an attack has been detected, mitigation typically entails manual intervention by a human user. For example, an attack detection alert may be provided to a user interface device (e.g., an electronic display) for further review by a network administrator. The administrator may then analyze the associated traffic data to take measures such as traffic scrubbing, blocking seemingly malicious traffic, verifying that the traffic was not generated by bots, etc. In general, attack mitigation strategies that incorporate human intervention often experience long delays, which may be unacceptable in certain situations, and are often cumbersome.

Hierarchical Attack Detection in a Network

The techniques herein allow for the automatic segregation of attack and normal traffic in a network attack (e.g., DoS, etc.) using non-supervised machine learning processes. In particular, traffic flows may be split into multiple clusters in machine learning and an attack detection mechanism may be applied to different cluster combinations until an optimal combination is found that does not trigger attack detection. In some aspects, a cleaning mechanism is disclosed that includes an attack detector configured to analyze aggregated traffic and a granular attack detector configured to analyze clusters of traffic data. In further aspects, techniques are described herein that allow potentially mislabeled traffic flows to be further refined. In yet another aspect, the attack detection and traffic segregation mechanisms may be co-located on a device, distributed across multiple devices, and/or processed in parallel.

Specifically, according to one or more embodiments of the disclosure as described in detail below, a device in a network identifies a set of traffic flow records that triggered an attack detector. The device selects a subset of the traffic flow records and calculates aggregated metrics for the subset. The device provides the aggregated metrics for the subset to the attack detector to generate an attack detection determination for the subset of traffic flow records. The device identifies one or more attack traffic flows from the set of traffic flow records based on the attack detection determination for the subset of traffic flow records.

Illustratively, the techniques described herein may be performed by hardware, software, and/or firmware, such as in accordance with processes 244 and 247-249 which may contain computer executable instructions executed by the processor 220 (or independent processor of interfaces 210) to perform functions relating to the techniques described herein. In some cases, the techniques herein may be treated as extensions to conventional protocols, such as the various PLC protocols or wireless communication protocols, and as such, may be processed by similar components understood in the art that execute those protocols, accordingly.

Operationally, non-supervised machine learning (e.g., without supervision by a human expert) may be used to segregate traffic into attack traffic and non-attack traffic. The flagged traffic then may be used to implement one or more attack mitigation strategies, such as creating a network rule to perform countermeasures when the flagged attack traffic is detected.

Figure 4:
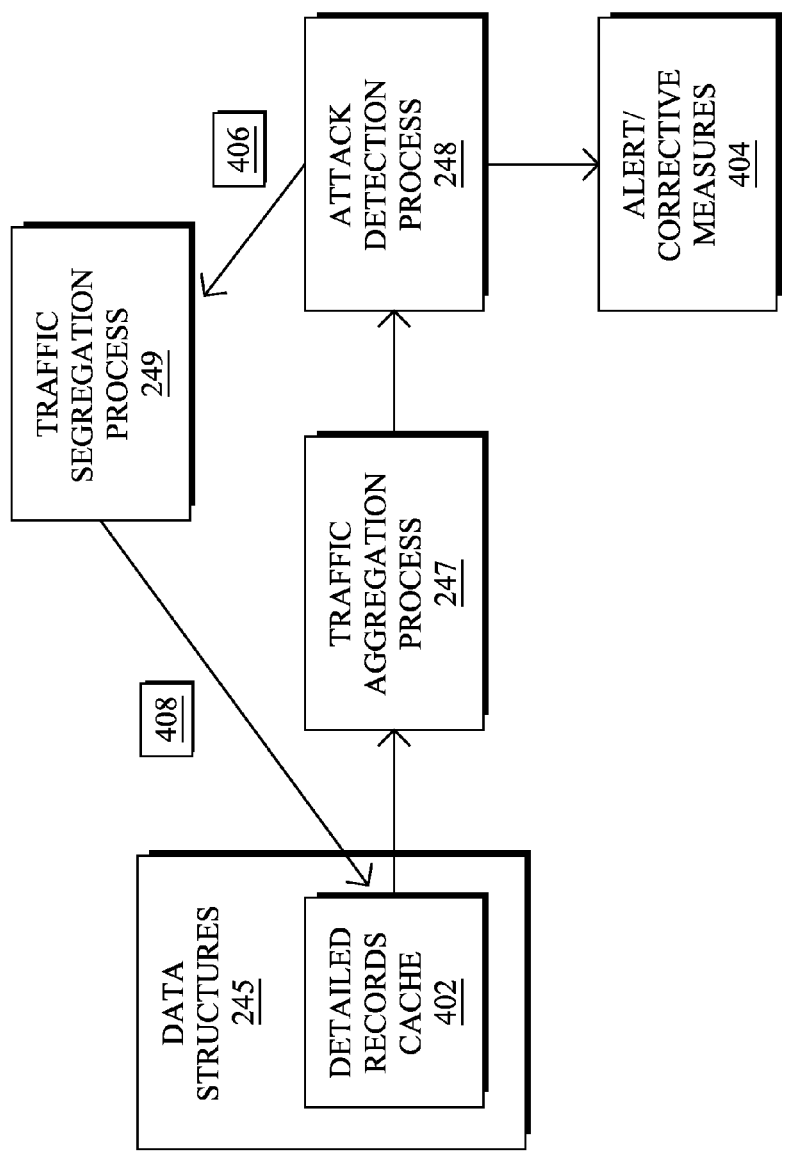
FIG. 4 illustrates an example architecture for detecting a network attack.

An example architecture 400 is shown in FIG. 4 for detecting a network attack, according to various embodiments. In various embodiments, data structures 245 and processes 247-249 may be co-located on a single device (e.g., one of nodes/devices 104, one of servers/controllers 102, etc.) or may be distributed across different devices. Further, architecture 400 may be configured to process traffic data in parallel, such as by duplicating any of processes 247-249, in one embodiment.

As shown, a device may receive as input a steady flow of detailed traffic records (e.g., a set of NETFLOW or IPFIX records, etc.). These records may be stored in a detailed records cache 402 as part of data structures 245. Notably, different implementation models and associated policies may be chosen to structure and populate cache 402 (e.g., which records are to be stored, how long records are to be maintained, etc.). In general, cache 402 provides a detailed snapshot of the current traffic composition.

Each traffic record in records cache 402 may be provided to traffic aggregation process 247. In various embodiments, traffic aggregation process 247 is configured to compute a vector of aggregated features for the current traffic composition from the records in cache 402. Example aggregated features that may be calculated by traffic aggregation process 247 may include, but are not limited to: an average flow duration, an average number of sent packets in the traffic, an average number of bytes of the traffic (e.g., an average traffic size), a proportion of traffic associated with a particular application (e.g., web requests, etc.), or the like. In one embodiment, traffic aggregation process 247 uses a sliding window model to compute the aggregate traffic metrics. For example, traffic aggregation process 247 may compute an average traffic metric using traffic records for the past thirty seconds, minute, hour, etc., and "sliding" the window of analysis as time progresses. In other embodiments, traffic aggregation process 247 may use other computational models such as binning, to aggregate the traffic records in cache 402.

Traffic aggregation process 247 may provide the computed vector of aggregated traffic data to attack detection process 248. In response, attack detection process 248 may analyze the aggregated traffic data to determine whether or not an attack (or specific type of attack) is detected. In various embodiments, attack detection process 248 uses a machine learning technique to detect an attack by analyzing the aggregated data. For example, attack detection process 248 may use classification-based techniques (e.g., ANNs, support vector machines (SVMs), maximum likelihood classifiers, etc.), anomaly detection based techniques (e.g., techniques that analyze the degree of variation in the traffic metrics), or any other machine learning-based technique suitable for attack detection.

In various embodiments, if attack detection process 248 determines that an attack is present based on the aggregated traffic data from traffic aggregation process 247, it may trigger the activation of another, more fine-grained, machine learning process to perform a more detailed analysis of the records in cache 402. For example, as shown, attack detection process 248 may notify traffic segregation process 249 that an attack has been detected from the aggregated traffic metrics. In response, traffic segregation process 249 may generate a new feature space 408 (e.g., input data for a machine learning attack detector) using the records in cache 402. In contrast to the aggregated attack detection mechanism, the new feature space 408 for attack detection process 248 may correspond to a single, non-aggregated traffic record from cache 402. Example features that may be included in feature space 408 may include, but are not limited to, a measured flow duration (e.g., a single measurement, in contrast to an average, etc.), a measured number of bytes in a particular flow, one or more flags that specify whether a particular flow bellows to a well-known application (e.g., traffic from each application may correspond to a separate feature), other forms of non-aggregated traffic metrics, or the like.

During operation, traffic segregation process 249 and attack detection process 248 may operate iteratively to segregate traffic flows into 'attack' and 'normal traffic' classes. In other words, the analysis of non-aggregated traffic data by attack detection process 248, aggregation process 247, and traffic segregation process 249 may be repeated any number of times iteratively until a set of traffic records from cache 402 is identified that does not trigger a detected attack by attack detection process 248. For example, traffic segregation process 249 may continue to feed different sets of traffic records to attack detection process 248 (e.g., via aggregation process 247 that computes aggregated metrics for each cluster) until a maximal set of non-attack related records is identified. Any traffic flows that are outside of this set, therefore, may be labeled as attack-related by attack detection process 248. In response, attack detection process 248 may generate a notification 404 that includes an alert (e.g., to alert another device, to alert a network administrator, etc.) and/or other corrective measures (e.g., to automatically generate a rule to handle traffic related to the segregated attack traffic, etc.). Notably, an opposite process may be used to determine the largest set of records that still set off the attack detector (e.g., by analyzing subsets that are likely to set off the attack detector).

Figure 5:
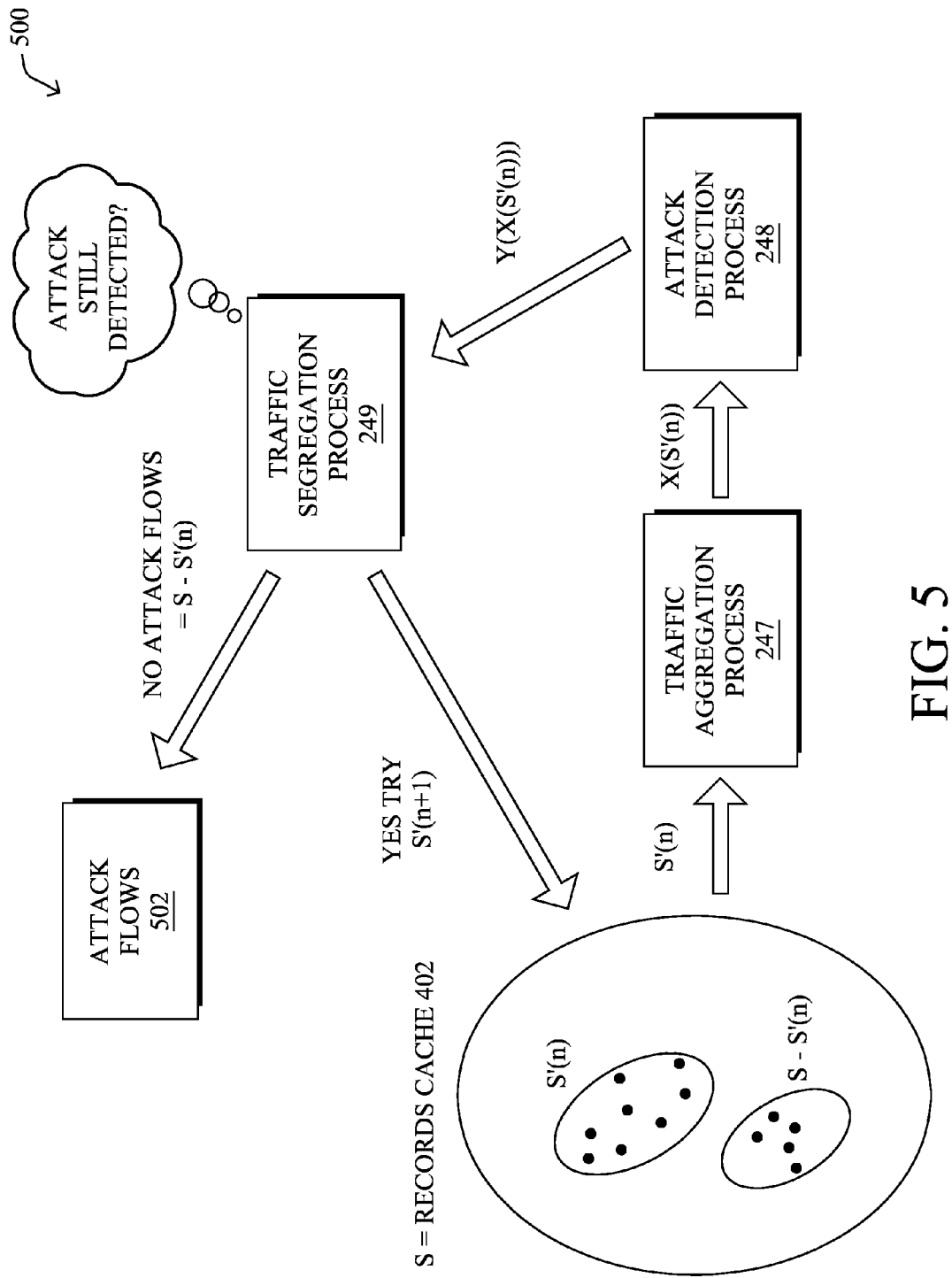
FIG. 5 illustrates an example of traffic data being segregated into attack and non-attack traffic data.

An example of traffic data being segregated into attack and non-attack traffic data is shown in FIG. 5, according to various embodiments. In particular, given the overall set of observed traffic flows S in records cache 402, the goal of mechanism 500 is to segregate the traffic flows into either an 'attack' classification or a 'normal traffic' classification. The set S may be decomposed into a subset S' that does not cause attack detection process 248 to fire up (e.g., S' contains only normal traffic). Once such a stopping condition (e.g., convergence criterion) has been met, the traffic flows that are outside of S' (e.g., S-S') may be identified as attack flows 502.

Assuming an ideal attack detection mechanism with perfect recall (e.g., an attack detector that can fire up even if only one attack flow is present), the optimal S' would be the largest possible subset that causes the detector not to fire up. However, with a real-world detector, the fact that the detector did not fire up for a given subset S' is not necessarily indicative that the subset does not contain an attack-related traffic flow. Thus, one or more stopping criteria (e.g., convergence criteria) may be used in mechanism 500, to determine when the iterative analysis should be stopped. Notably, different objective functions may be used as stopping criteria for the traffic segregation mechanism, in various implementations (e.g., exhaustively evaluating every possible subset, stopping the analysis after x-number of rounds, etc.).

In one embodiment of this invention, traffic segregation using the non-aggregated traffic from cache 402 may be performed locally on the machine hosting the attack detectors (e.g., the device may host all of processes 247-249). In another embodiment, the non-aggregated traffic from cache 402 may be sent via a custom IPv4 or IPv6 message to a central agent (potentially with high-end processing capabilities), to perform the segregation. In such a case, a control loop may be formed between the agent performing the segregation and the attack detection classifiers. A reply message containing the segregated traffic may then be returned to the device hosting the attack detectors. In yet another embodiment, both the classifier and the non-aggregated traffic may be sent to a central agent to perform segregation (e.g., a server/controller 102, such as an NMS, network controller, etc.).

In general, the traffic segregation mechanism 500 may operate as follows. First, let S'(n) be a subset of the flows in S which represents the candidate normal traffic subset at iteration n. Such subsets may be generated by traffic segregation process 249 any number of times until the stopping/convergence criteria are met. Next, let X(S'(n)) be the vector of the aggregated statistics computed by traffic aggregation process 247 over the records in S'(n). Also, let Y(X(S'(n))) be the output of the detector when its input is X(S'(n)). A single iteration of the segregation process may then entail the following:

1.) Compute S'(n).
2.) Provide S'(n) as input to traffic aggregation process 247, which will return X(S'(n)).
3.) Provide X(S'(n)) to attack detection process 248, which will return Y(X(S'(n))).
4.) The result Y(X(S'(n))) is then fed back into traffic segregation process 249, which will decide whether the convergence criterion for the algorithm has been met. The specific convergence criterion depends on the particular implementation of the block. For example, a naive implementation would be to stop the computation as soon as Y(X(S'(n))) shows that the attack is not detected. However, for the reasons stated previously, this typically does not yield an optimal solution.

If traffic segregation process 249 determines that the stopping criteria have not been met, it may compute another candidate subset S'(n+1) and another round of computation will follow. In some cases, the choice of S'(n+1) may depend on the previously received feedbacks Y(X(S'(i))) for i in [0, n]. This reflects the fact that the output of attack detection process 248 on a candidate subset is potentially used in order to create the following candidate subset.

In some embodiments, traffic segregation may be parallelized. In particular, the traffic records in cache 402 may be divided into different subsets that are fed into any number of different attack detection processes 248, which analyze the different subsets in parallel.

Notably, in the embodiment shown in FIG. 5, the aggregation/detection chain used for traffic flagging is identical to that used for attack detection (e.g., the same data flow used to detect attacks from the aggregated traffic data). In another embodiment, however, a specific detection chain configured and trained for traffic segregation may be used instead.

As would be appreciated, the attack detection and traffic segregation mechanisms described herein may operate in an unsupervised manner. In other words, they do not leverage a-priori knowledge of the attack and/or normal traffic.

In some embodiments, traffic segregation process 249 may use clustering, to form the different subsets of S for analysis. In particular, clustering is an umbrella term for different machine learning techniques that attempt to split a set of samples into multiple subsets (e.g., clusters), where the samples in a given cluster are more similar to one another than that of other clusters. Such similarity can range, for example, from a simple Euclidian distance between data points to more specific metrics. Regardless of the clustering technique used, clustering the set S may result in a set of clusters $\{C_1 \ldots C_{Nc}\}$ of non-overlapping subsets of S, where Nc is the number of clusters.

When traffic segregation process 249 uses clustering, computation of the optimum S'(n) can be expressed as a constrained optimization problem. In particular, given the set of all of the possible combinations of 1 to Nc−1 clusters (e.g., there is always at least one cluster left out of the combination at during any round), the objective is to find the combination $G_i = \{C_a \cup C_b \cup C_c \ldots\}$ so as to maximize the number of flows in $G_i$ while satisfying the constraint that Y(X(Gi)) still corresponds to a 'normal traffic' classification result by attack detection process 248. In other words, the optimization may entail identifying the largest combination of traffic clusters such that its associated statistics do not cause attack detection process 248 to detect an attack.

In one embodiment, an exhaustive search may be performed to determine the optimal solution by analyzing all of the possible cluster combinations. However, this results in the following number of iterations:

$$\text{iterations} = \sum_{i=1}^{i=Nc-1} \text{Binomial}(Nc, i).$$

Since, for each of those combinations, new aggregated statistics on the candidate flow set have to be computed, this method is not likely to scale. More scalable, sub-optimal solutions may also be used, in other embodiments.

In another embodiment, for each cluster Ci in the cluster set, Y(X(S−Ci)) may be computed. Subsequently, the clusters Ci are sorted by decreasing value of Y(X(S−Ci)). Notably, an essential assumption behind this technique is that the value of Y decreases as the behavior of the input traffic becomes more and more similar to that of the normal traffic. Example pseudo code for optimizing the solution using this approach is as follows:

```
/* clusters are used to initialize a list where they are sorted by increasing
Y(X(S − Ci)) */
        CandidateClusterList = sort(Ci, key = Y(X(S − Ci));
/* here is the list of clusters which will be flagged as attack traffic
(initialized as an empty list) */
        FlaggedClusterList = { };
        While length(CandidateClusterList) > 1
/* the cluster with lowest Y(X(S − Ci)) among those left in the list is
removed from the list and added to the set of clusters which will
be flagged */
        Newcandidate = CandidateClusterList.pop_head( );
        FlaggedClusterList.append(Newcandidate);
/* the resulting score for clusters left in the list is evaluated and used
for checking whether convergence has been reached */
/* the clusters which have been flagged as attack traffic are removed from
the global set of flows */
        CandidateNormalTraffic = S − FlaggedClusterList;
// the remaining flows are aggregated and the results is submitted to the
detector
        CandidateScore = Y(X(CandidateNormalTraffic));
// if the detectors does not fire up any more, the convergence criterion
is met
        If (attack_is_not_detected(CandidateScore))
        {
        Traffic in MitigatedClusterList is flagged as attack traffic;
}}}
```

In other words, clusters may be sorted by their capability of decreasing the Y metric of the overall traffic when they are removed. During iteration of the segregation mechanism, clusters are removed one at a time from the overall traffic set until the remaining flows do not cause the attack detector to detect an attack. Advantageously, this approach has linear complexity, although it is not guaranteed to converge to an optimal solution.

Another important free parameter of many clustering algorithms is the number of clusters, which typically has to be set a-priori. In case an exhaustive search can be afforded (e.g., when the process is hosted on a centralized host device with high resources, such as a controller/server 102), the number of clusters can be considered as another parameter to be optimized. In particular, this may entail exploring every possible cluster combination for each viable number of clusters. This implies an even higher degree of complexity. In particular, for a range of possible cluster numbers $[Nc_{min}, \ldots, Nc_{max}]$, the number of iterations of the segregation process becomes:

$$\text{iterations} = \sum_{j=Ncmin}^{j=Ncmax-1} \sum_{i=1}^{i=j-1} \text{Binomial}(j, i).$$

Note, however, that clustering algorithms such as DBSCAN and Mean-Shift do not require a fixed, predefined number of clusters, since they automatically provide the number of clusters in the data. In these cases, therefore, the complexity may be reduced.

As mentioned earlier, in case of an ideal detector block, the largest S'(n) which causes the attack detector not to fire up would create an optimal traffic segregation. However, two factors may prevent making such an assumption. First, even if the detector does not fire up, some malicious flows may still be in the subset classified as having normal traffic. Conversely, samples of normal traffic may still be in the traffic flagged as an attack (e.g., the aggregated traffic that attack detection process 248 labeled as indicative of an attack).

By virtue of how clustering is typically performed, each cluster potentially includes both normal and attack flows, which would be true for any combination of clusters. Thus, even if the stopping/convergence criteria ensure that a certain degree of separation has been achieved between normal and attack traffic, a further refinement can be carried out, in some embodiments. In particular, an additional mechanism may be used to refine the performed traffic segregation. Once a set of flows S has been split between normal and attack categories, this mechanism may operate to perform an even more fine-grained analysis within the two subsets. The basic idea is that normal traffic samples will stick out as outliers (e.g., anomalies) in the flagged traffic set, and vice-versa. Thus, such a mechanism may employ outlier or anomaly detection techniques (e.g., based on a statistical measure of how far a given observation differs from a set of other observations). For example, Chauvenet's criterion, a Mahalanobis distance, etc. may be computed to detect an outlier.

Figure 6:
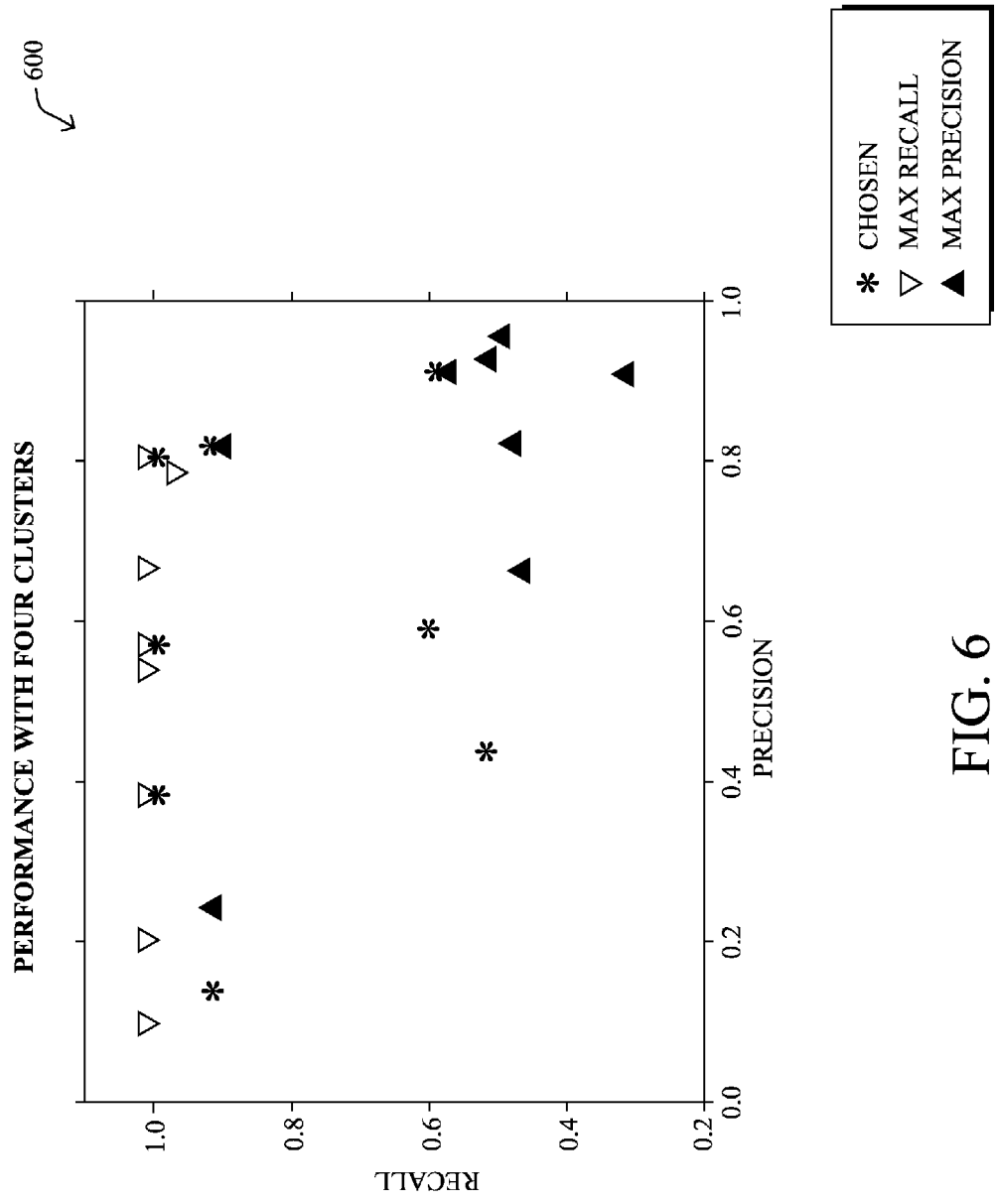
FIG. 6 illustrates an example plot of classifier performance metrics.

FIG. 6 illustrates an example plot 600 of classifier performance metrics, in one embodiment. As shown, prototype implementations in accordance with the teachings herein were tested for performance. In particular, the scatter plot 600 represents the output of the traffic segregation techniques herein on a dataset that includes several traces of traffic records that include both normal traffic and HTTP recursive get flows (e.g., a form of attack). Notably, each flow was labeled manually as belonging to either normal traffic or attack traffic, so that the performance could be evaluated using a ground truth. For each trace, k-means clustering was used to compute the evaluated clusters of traffic data. To choose the finalized cluster combination that only includes normal traffic, the simple linear optimization technique described above was used.

As shown, two different data points are depicted for each trace in the tested data set. Each point represents the achieved precision (e.g., accuracy) and recall (e.g., sensitivity) for a chosen segregation. A depicted '*' symbol in plot 600 represents the performance of the prototype's output segregation. A 'Δ' symbol in plot 600 represents the maximum precision possible for the cluster combination. Finally, a '▼' symbol in plot 600 represents the performance of the cluster combination with maximum recall. Notably, in order to compute the maximum precision and recall solutions, knowledge of the ground truth is required. Thus, these data points are reported just to provide a performance benchmark. As would be appreciated, some results of the prototype represent good performance tradeoffs (e.g., 95% recall and 95% precision), indicating that the clustering mechanism may be used to segregate attack and normal traffic.

Figure 7:
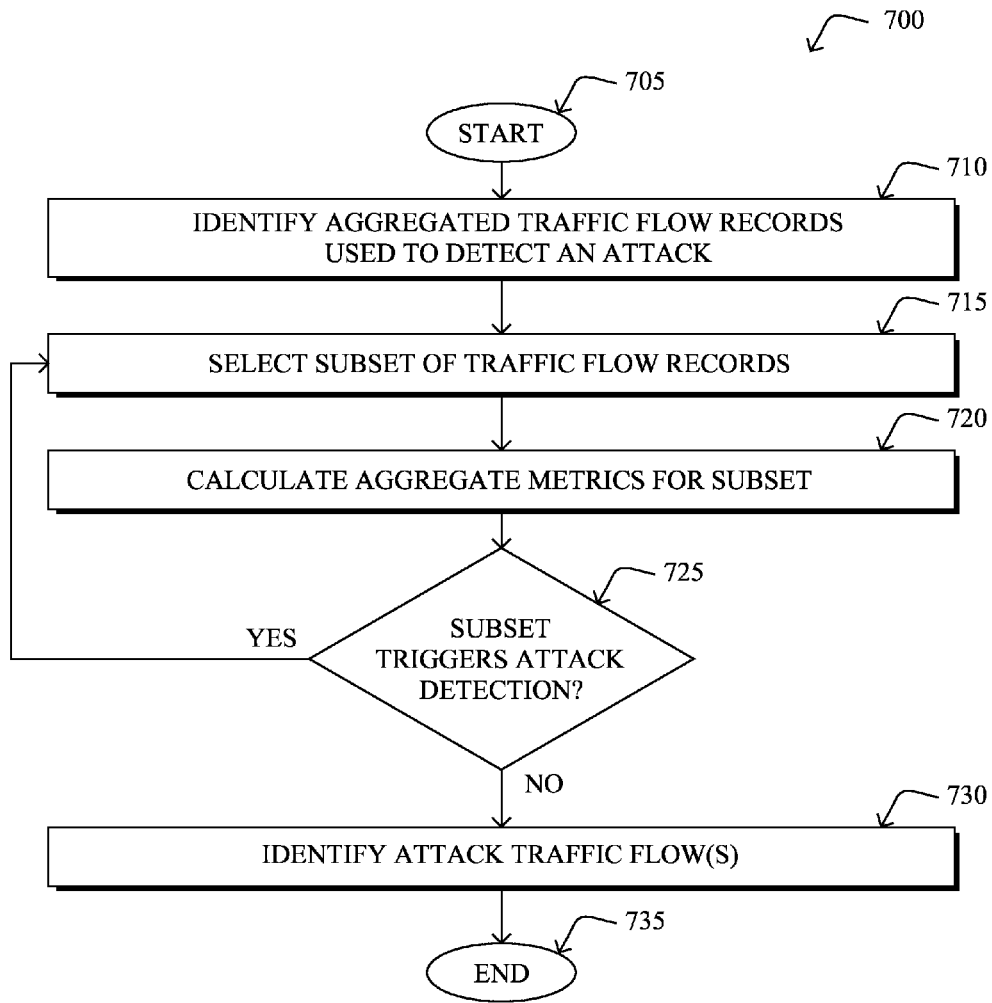
FIG. 7 illustrates an example simplified procedure for identifying attack-related traffic flows.

FIG. 7 illustrates an example simplified procedure for identifying attack-related traffic flows, in accordance with one or more embodiments described herein. Notably, procedure 700 may be performed by any device in a network such as, for example, any of nodes/devices 104 or controllers/servers 102 shown in FIG. 1. The procedure 700 may start at step 705, and continues to step 710, where, as described in greater detail above, the device identifies traffic records that triggered an attack detector. For example, an aggregated set of metrics (e.g., an average flow duration, etc.) for a complete set of traffic data may trigger attack detection process 248 to detect that an attack is present. In such a case, the corresponding traffic records may be identified. In various embodiments, the device itself may execute the attack detector or may receive an indication of the detected attack from another device that hosts the attack detector (e.g., the segregation and attack detection processes may be co-located or distributed).

At step 715, the device selects a subset of the traffic records for analysis, as detailed above. In some embodiments, the subset may be selected using a clustering technique (e.g., by grouping the traffic records into n-number of groups having similar characteristics). For example, the subset may be selected by grouping the traffic records by one or more of their characteristics (e.g., based on the size of their traffic flows, flow durations, associated applications, etc.). For example, clustering may be used to form a set of data clusters from the traffic records. Notably, the selected subset may include one or more of the clusters. In various embodiments, the device may vary the quantity of clusters and/or combination of clusters, to evaluate different subsets of the traffic records. In some cases, the device may also use anomaly or outlier detection to exclude a particular cluster group from inclusion in the selected subset (e.g., the cluster group that is most likely to correspond to attack-related traffic may be excluded from analysis).

At step 720, the device calculates aggregated traffic metrics for the subset of traffic records, as detailed above. For example, the selected subset for analysis may be provided to traffic aggregation process 247, as shown in FIG. 4. The aggregated metrics may also be generated for use as the inputs of an attack detector, such as the attack detector used to detect the attack of step 710 or another attack detector.

At step 725, the device decides whether or not the aggregated metrics of the subset trigger an attack detector, as detailed above. For example, as shown in FIG. 6, the subset may be provided to attack detection process 248, which makes an attack detection determination. If, for example, the device determines that the subset contains normal traffic, the device may treat the traffic records that are outside of the subset as suspect. In some embodiments, steps 715-725 may be performed any number of times on different subsets, to determine an optimal subset of traffic records that do not trigger the attack detector. Such an optimal subset may be identified, for example, by exhaustively analyzing all of the possible subsets (e.g., by exhaustively varying the number of cluster and possible cluster combinations). In other cases, steps 715-725 may be repeated any number of times to analyze different subsets until a convergence/stopping criterion is met. For example, the device may analyze a ranked order of clusters (e.g., according to outlier/anomaly scores associated with different cluster groups), analyze a fixed number of subsets, etc., before stopping. One the stopping/convergence criterion has been met, procedure 700 continues on to step 730.

At step 730, the device may identify one or more attack-related traffic flows from the set of traffic records, as described in greater detail above. In particular, if an optimal (e.g., largest, etc.) subset of the traffic records that does not trigger the attack detector is found in step 725, the device may label any traffic records outside of the subset and in the original set from step 710 as being attack-related. Such information may be used by the device, for example, to take corrective measures, generate an alert (e.g., to notify a network administrator, etc.), to generate a security rule, etc. Procedure 700 then ends at step 735.

Figure 8:
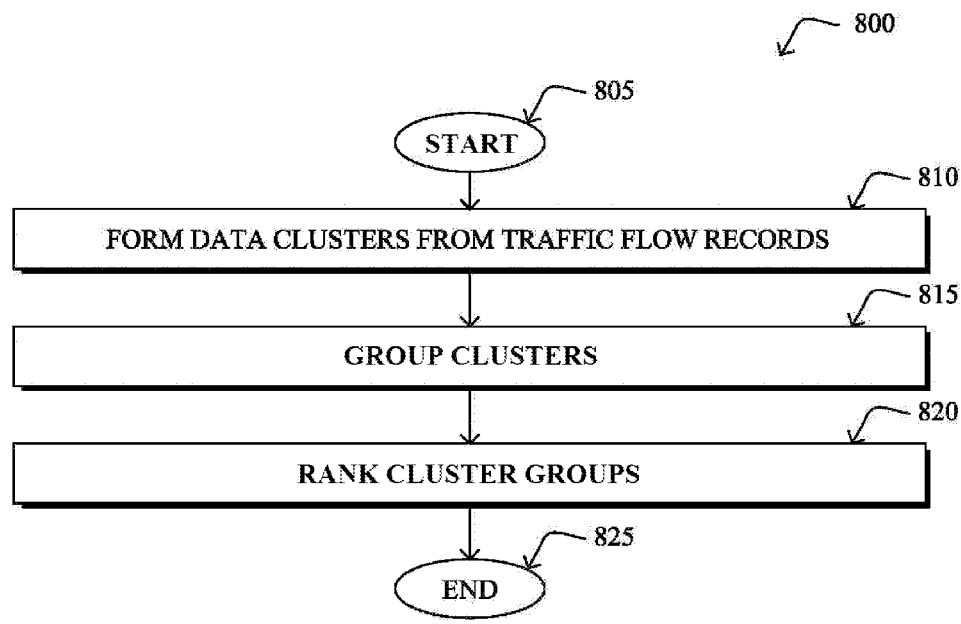
FIG. 8 illustrates an example simplified procedure for clustering traffic data.

FIG. 8 illustrates an example simplified procedure for clustering traffic data, according to various embodiments. Procedure 800 may be performed by any device in a network such as, for example, any of nodes/devices 104 or controllers/servers 102 shown in FIG. 1. The procedure 800 may start at step 805, and continues to step 810, where, as described in greater detail above, the device forms data clusters from the traffic data that triggered an attack detector. Any number of clustering techniques may be used to cluster the traffic records according to one or more of their characteristics (e.g., a measured flow duration, flow size, associated application, etc.). For example, the device may cluster the traffic records using k-mean clustering, DBSCAN clustering, mean-shift clustering, or any other clustering approach. In other embodiments, the device may form the data clusters based on criteria other than the similarities of the traffic records. For example, the data clusters may alternatively be formed using another machine learning process, formed randomly, or in any other way. The number of data clusters may also be varied, in some embodiments. For example, the device may form two, three, four, etc., different data clusters, to vary the subset of traffic records to be analyzed by an attack detector (e.g., to identify the largest subset that does not trigger an attack detection).

At step 815, the device groups the clusters into one or more cluster groups, as described in greater detail above. Notably, a given cluster group may include one or more of the data clusters formed in step 810. In some embodiments, the device may vary the combinations of the data clusters to form the cluster groups. For example, the device may form different cluster groups, to vary the subset of traffic records to be analyzed by an attack detector (e.g., to identify the largest subset of that does not trigger an attack detection).

At step 820, the device rank the cluster groups, as described in greater detail above. In particular, the different cluster groups may be sorted based on the likelihood that excluding a particular cluster group from analysis by the attack detector will affect the outcome of the attack detector. For example, in one embodiment, anomaly scores may be calculated for the cluster groups and the cluster groups may be ranked based on their anomaly scores. In other words, the device may analyze each cluster group to assess how much each group varies from the expected. Procedure 800 then ends at step 825.

Figure 9:
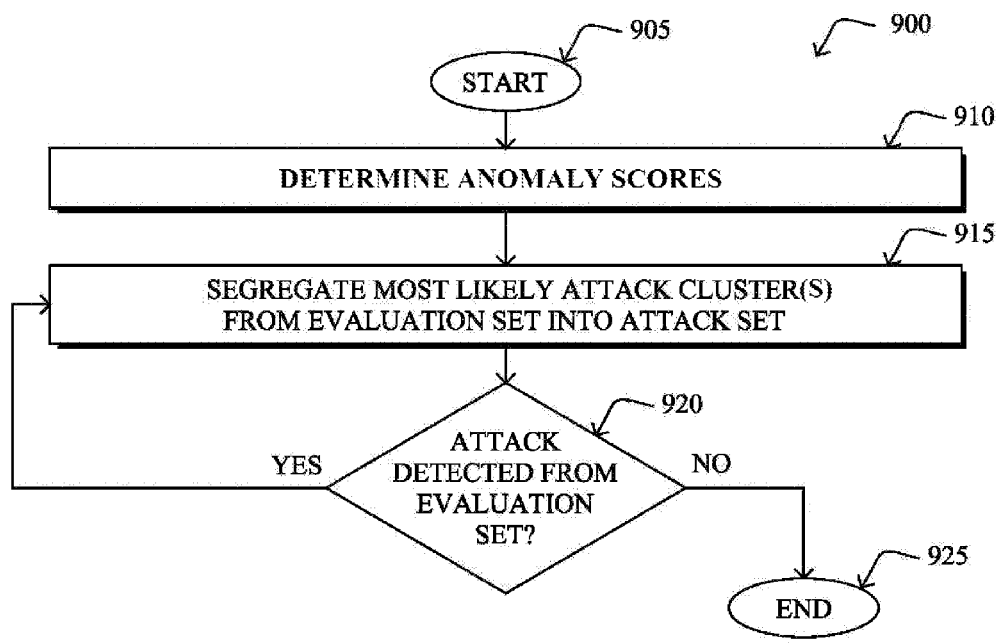
FIG. 9 illustrates an example simplified procedure for scoring clusters of traffic data to segregate traffic flows.

FIG. 9 illustrates an example simplified procedure for scoring clusters of traffic data to segregate traffic flows in accordance with one or more embodiments described herein. Procedure 900 may be performed by any device in a network such as, for example, any of nodes/devices 104 or controllers/servers 102 shown in FIG. 1. The procedure 900 may start at step 905, and continues to step 910, where, as described in greater detail above, the device may determine anomaly scores for different cluster groups. For example, a device may use procedure 900 or another process to determine the cluster scores and rank the cluster groups accordingly.

At step 915, the device segregates (e.g., excludes) the most likely attack cluster(s) from a subset of traffic records to be analyzed by the attack detector, as described in greater detail above. In particular, the device may exclude a cluster group from analysis by the attack detector based on the anomaly score associated with the cluster group. In other words, the cluster group (which contains one or more data clusters) that is most likely to influence the output of the attack detector may be set aside (e.g., in an attempt to identify the largest subset of traffic records that does not trigger the attack detector).

At step 920, as detailed above, the device may decide whether or not the analyzed subset of traffic records triggered the attack detector. In particular, the subset of traffic records excluding those of the excluded cluster(s) from step 915 may be assessed by the attack detector. If the attack detector still detects an attack, procedure 900 may return to step 915, thereby repeating the exclusion and analysis process until the analyzed set does not set off the attack detector. In such a case, procedure 900 then ends at step 925.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, allow for a totally passive traffic segregation mechanism (e.g., non-supervised learning process) that can be used to segregate traffic flows into attack-related and normal traffic categories. In addition, the techniques herein can be highly distributed and do not need to be installed on major chokepoints. In addition, the traffic segregation mechanism does not require a-priori information to perform the segregation or preset thresholds.

While there have been shown and described illustrative embodiments that provide for segregating traffic data into attack-related and normal traffic categories, it is to be understood that various other adaptations and modifications may be made within the spirit and scope of the embodiments herein. For example, the embodiments herein have been described with respect to certain attack detection and machine learning techniques. However, the embodiments in their broader sense are not as limited, and may, in fact, be used with other types of attack detection and machine learning techniques. In addition, while certain protocols and network configurations are shown, other suitable protocols and network configurations may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a device in a network, a set of traffic flow records that triggered an attack detector to detect a network attack;
   applying, by the device, clustering to the set of traffic flow records to form non-overlapping clusters of the traffic flow records in the set of traffic flow records;
   iteratively analyzing the set of traffic flow records by:
   selecting, by the device, a subset of the set of traffic flow records as a combination of one or more of the non-overlapping clusters of the traffic flow records;
   calculating, by the device, aggregated metrics for the selected subset of the set of traffic flow records, wherein the aggregated metrics comprise one or more statistics regarding network traffic flows associated with the traffic flow records in the selected subset of the set of traffic flow records; and providing, by the device, the aggregated metrics for the selected subset of the set of traffic flow records to the attack detector, to generate an attack detection determination for the subset of the set of traffic flow records, wherein the device repeats the selecting, calculating, and providing, to generate attack detection determinations for different combinations of the non-overlapping clusters of the traffic flow records until a convergence criterion is met;

wherein the convergence criterion corresponds to the attack detector determining that a particular combination of the non-overlapping clusters of the traffic flow records does not trigger the attack detector to detect the network attack;

wherein the non-overlapping clusters of the traffic flow records are formed based on one or more of: flow durations indicated by the traffic flow records, flow sizes indicated by the traffic flow records, application types indicated by the traffic flow records, or statistical properties of the traffic flow records; and identifying, by the device, one or more attack traffic flows from the set of traffic flow records based in part on the attack detection determination for the subset of the set of traffic flow records.

2. The method as in claim 1, wherein the particular combination of the non-overlapping clusters of the traffic flow records comprises a maximal number of the non-overlapping clusters of the traffic flow records that does not trigger the attack detector to detect the network attack.

3. The method as in claim 1, further comprising:
associating anomaly scores with the non-overlapping clusters of the traffic flow records, wherein the subset of the set of traffic flow records is selected based in part on the anomaly scores associated with the combination of the one or more non-overlapping clusters of the traffic flow records.

4. The method as in claim 3, wherein selecting the subset of the set of traffic flow records comprises:
excluding a particular one of the non-overlapping clusters of the traffic flow records from the selected subset of the set of traffic flow records based on the anomaly score associated with the particular one of the non-overlapping clusters of the traffic flow records.

5. The method as in claim 1, wherein the different combinations of the non-overlapping clusters of the traffic flow records vary in quantity.

6. The method as in claim 1, further comprising:
executing the attack detector on the device.

7. An apparatus, comprising:
one or more network interfaces to communicate with a network;
a processor coupled to the network interfaces and configured to execute one or more processes; and
a memory configured to store a process executable by the processor, the process when executed operable to:
identify a set of traffic flow records that triggered an attack detector to detect a network attack;
apply clustering to the set of traffic flow records to form non-overlapping clusters of the traffic flow records in the set of traffic flow records;
iteratively analyze the set of traffic flow records by:
selecting a subset of the set of traffic flow records as a combination of one or more of the non-overlapping clusters of the traffic flow records;
calculating aggregated metrics for the selected subset of the set of traffic flow records, wherein the aggregated metrics comprise one or more statistics regarding network traffic flows associated with the traffic flow records in the selected subset of the set of traffic flow records; and
providing the aggregated metrics for the selected subset of the set of traffic flow records to the attack detector to generate an attack detection determination for the subset of set of traffic flow records,
wherein the apparatus repeats the selecting, calculating, and providing, to generate attack detection determinations for different combinations of the non-overlapping clusters of the traffic flow records until a convergence criterion is met;
wherein the convergence criterion corresponds to the attack detector determining that a particular combination of the non-overlapping clusters of the traffic flow records does not trigger the attack detector to detect the network attack:
wherein the non-overlapping clusters of the traffic flow records are formed based on one or more of: flow durations indicated by the traffic flow records, flow sizes indicated by the traffic flow records, application types indicated by the traffic flow records, or statistical properties of the traffic flow records; and
identify one or more attack traffic flows from the set of traffic flow records based in part on the attack detection determination for the subset of the set of traffic flow records.

8. The apparatus as in claim 7, wherein the particular combination of the non-overlapping clusters of the traffic flow records comprises a maximal number of the non-overlapping clusters of the traffic flow records that does not trigger the attack detector to detect the network attack.

9. The apparatus as in claim 7, wherein the process when executed is further operable to:
associate anomaly scores with the non-overlapping clusters of the traffic flow records, wherein the subset of the set of traffic flow records is selected based in part on the anomaly scores associated with the combination of the one or more non-overlapping clusters of the traffic records.

10. The method as in claim 9, wherein the subset of the set of traffic flow records is selected by:
excluding a particular one of the non-overlapping clusters of the traffic flow records from the selected subset of the set of traffic flow records based on the anomaly score associated with the particular one of the non-overlapping clusters of the traffic flow records.

11. The apparatus as in claim 7, wherein the different combinations of the non-overlapping clusters of the traffic flow records vary in quantity.

12. The apparatus as in claim 7, wherein the process when executed is further operable to:
execute the attack detector on the apparatus.

13. A tangible, non-transitory, computer-readable media having software encoded thereon, the software when executed by a processor operable to:
identify a set of traffic flow records that triggered an attack detector to detect a network attack;
apply clustering to the set of traffic flow records to form non-overlapping clusters of the traffic flow records in the set of traffic flow records;
iteratively analyze the set of traffic flow records by:

selecting a subset of the set of traffic flow records as a combination of one or more of the non-overlapping clusters of the traffic flow records;

calculating aggregated metrics for the subset of the traffic flow records, wherein the aggregated metrics comprise one or more statistics regarding network traffic flows associated with the traffic flow records in the selected subset of the set of traffic flow records; and providing the aggregated metrics for the selected subset of the set of traffic flow records to the attack detector, to generate an attack detection determination for the subset of the set of traffic flow records, wherein the device repeats the selecting, calculating, and providing, to generate attack detection determinations for different combinations of the non-overlapping clusters of the traffic flow records until a convergence criterion is met;

wherein the convergence criterion corresponds to the attack detector determining that a particular combination of the non-overlapping clusters of the traffic flow records does not trigger the attack detector to detect the network attack;

wherein the non-overlapping clusters of the traffic flow records are formed based on one or more of: flow durations indicated by the traffic flow records, flow sizes indicated by the traffic flow records, application types indicated by the traffic flow records, or statistical properties of the traffic flow records; and identify one or more attack traffic flows from the set of traffic flow records based in part on the attack detection determination for the subset of the set of traffic flow records.

* * * * *